United States Patent [19]

Uchida et al.

[11] Patent Number: 5,017,914
[45] Date of Patent: May 21, 1991

[54] CIRCUIT FOR DRIVING A LIQUID CRYSTAL DISPLAY PANEL

[75] Inventors: Masahide Uchida; Fumio Shida, both of Suwa, Japan

[73] Assignee: Seiko Epson Corporation, Tokyo, Japan

[21] Appl. No.: 440,418

[22] Filed: Nov. 20, 1989

Related U.S. Application Data

[63] Continuation of Ser. No. 201,977, Jun. 3, 1988, abandoned.

[30] Foreign Application Priority Data

Jun. 4, 1987 [JP] Japan .................................. 62-140399
May 16, 1988 [JP] Japan .................................. 63-118713

[51] Int. Cl.$^5$ ............................................. G09G 3/36
[52] U.S. Cl. ..................................... 340/784; 340/811; 340/793
[58] Field of Search ............... 340/793, 767, 765, 784, 340/805, 811; 350/332, 333; 358/236, 230

[56] References Cited

U.S. PATENT DOCUMENTS

| | | |
|---|---|---|
| 4,180,813 | 12/1979 | Yoneda . |
| 4,427,978 | 1/1984 | Williams .............................. 340/793 |
| 4,488,150 | 12/1984 | Kanatani ............................. 340/793 |
| 4,743,096 | 5/1988 | Wakai et al. ........................ 340/784 |
| 4,766,430 | 8/1988 | Gillette et al. ..................... 340/784 |
| 4,859,998 | 8/1989 | Kawamura et al. ................ 340/793 |

FOREIGN PATENT DOCUMENTS

| | | |
|---|---|---|
| 0051521 | 5/1982 | European Pat. Off. . |
| 0236198 | 9/1987 | European Pat. Off. . |
| 2134302 | 8/1984 | United Kingdom . |
| 2146479 | 4/1985 | United Kingdom . |

Primary Examiner—Jeffery A. Brier
Attorney, Agent, or Firm—Blum Kaplan

[57] ABSTRACT

A circuit for driving an active matrix liquid crystal display having M rows and N columns by video digital data of K bits is provided. The rows and columns intersect at a plurality of thin film transistors which form at least in part a pixel at each intersection of a column and row. An analog switch capable of ON and OFF state receives a video voltage, a discharge power supply voltage and a control signal and selectively outputs either the video voltage and the discharge power supply voltage to each column in response to a control signal. The video voltage varies in level sequentially increasing from the OFF state at least once each horizontal scanning period. A control receives the K bit digital input data and produces a control signal for controlling the time of the ON state of the analog switch in response to the input data. K is an integer at least equal to 1.

16 Claims, 8 Drawing Sheets

FIG. 6
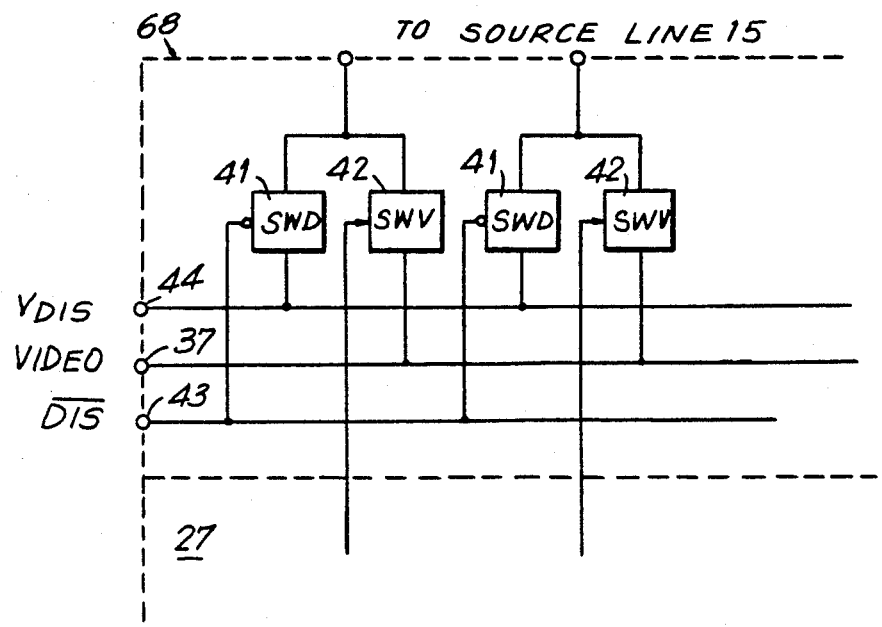
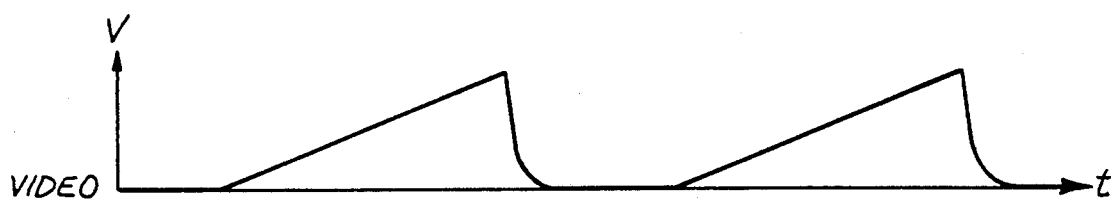
FIG. 7

CIRCUIT FOR DRIVING A LIQUID CRYSTAL DISPLAY PANEL

This is a continuation of application Ser. No. 201,977, filed on June 3, 1988, now abandoned.

BACKGROUND OF THE INVENTION

This invention relates to a circuit for driving a liquid crystal display panel, and in particular, a circuit for driving an active matrix liquid crystal display panel having thin film transistor elements.

Active matrix liquid crystal display panels which include thin film transistor (TFT) elements have recently been improved to make them of practical use as a display panel for a pocket sized TV. The liquid crystal display devices are capable of receiving an input video signal and displaying the corresponding picture. The displayed picture was initially two inches across having two hundred and forty rows and two hundred and twenty columns. Driving systems such as the analog point at a time system and the analog line at a time system are adapted to these liquid crystal display devices to supply analog video signals directly to a liquid crystal display.

Reference is now made to FIG. 1 wherein a block diagram of a conventional analog line sequential system consisting of an X driver 1 and a Y driver 2 for driving an active matrix panel 3 is depicted. Panel 3 is divided into N rows and M columns X driver 1 includes a shift register 4 having M shift steps.

M sample hold circuit groups, generally indicated as 5, correspond to each M step of shift register 4, M being an integer. A second sample hold circuit group 6 includes M sample hold circuit groups corresponding to each M sample hold group of hold circuit group 5, thereby providing a two step sample hold circuit group. Each sample hold circuit of circuit group 5 includes an analog switch 7 which receives the M step output from shift register 4 and a VIDEO signal input at an input 60 and provides an output to a buffer amplifier 9. A capacitor 8 receives the output of analog switch 7 and holds the sample. The control terminal of each analog switch 7 is connected to the output of the respective steps of shift register 4. Each sample hold circuit of sample hold circuit group 6 includes an analog switch 10, a buffer amplifier 12 receiving an input from analog switch 10 and a capacitor 11 receiving an input from analog switch circuit 10 Capacitor 11 holds the input sample. The control terminal of each analog switch 10 is connected to input 63, which receives a latch clock signal LCL. The input terminals of the analog switch 10 are each connected to the output of the buffer amplifiers 9.

The outputs of buffer amplifiers 12 are each input at a source line 15 which is connected in the column direction to a column of active matrix liquid crystal panel 3. Shift register 4 receives a start pulse signal XSP at an input 61 for beginning the shifting of shift register 4 and a clock signal XCL at an input 62 for timing the shifting of shift register 4.

Y driver 2 includes a shift register 13 having N steps corresponding to N outputs, N being an integer. Shift register 13 receives a start pulse signal YSP at input 64 for beginning the shifting of shift register 13 and a clock signal YCL for timing the shifting of shift register 13. Each output of shift register 13 inputs into a respective buffer amplifier 14. The respective outputs of buffer amplifiers 14 are each input to active matrix liquid crystal panel 3 at a gate line 16 which is connected in the row direction to a row of active matrix liquid crystal panel 3.

Active matrix liquid crystal panel 3 may then be considered to be divided by M source lines 15 arranged in the column (vertical) directions and N gate lines 16 arranged in the row (horizontal) direction. A pixel transistor 17, positioned at the intersection of each source line 15 and gate line 16, receives as its gate input the signal from gate line 16 and as its data input a signal from source line 15. Each pixel transistor 17 is associated with an individual pixel electrode 18 and receives an output from pixel transistor 17. A common electrode 19 is opposing to pixel electrodes 18.

During one horizontal scanning period 1H, when one gate line 16 is selected, a start pulse XSP is input to X driver 1 causing each address of the shift register to be shifted in accordance with the input clock signal XCL. Upon the output signals of each respective step of shift register 4, the VIDEO signal level input at input 16 is latched by each sample holder group 5. Upon the completion of 1H, the latch pulses of latch clock signal LCL input at input 63 are supplied to respective analog switches 10 of the sample hold circuit 6 and are latched as a group in sample hold circuit group 6. During the next scanning period 1H the latched VIDEO signal is input to liquid crystal panel 3 to effect display Then, the sample hold circuit of sample hold circuit group 5 inputs the video signal for the next gate line 16.

This arrangement is less than satisfactory particularly when utilized for a gray scale display having high resolution and comparatively less bits of input data. Several problems occur particularly in the prior art constructions utilize digital data stored in a video RAM (VRAM) which is displayed through a digital data process.

When a liquid crystal display panel having a larger display size, such as five to fourteen inches, is utilized it becomes necessary to increase the number of pixel elements. When a liquid crystal display panel having N pixel elements per column and M pixel elements per row is utilized for displaying the picture at a refresh frequency $F_r$, one horizontal scanning period $T_{1H}$ (hereinafter referred to as 1H) may be expressed by the following formula:

$$T_{1H} = 1/(N \times f_R) \quad \text{sec.}$$

Therefore, when all of the X drivers are connected in cascade and the data is sampled by a single clock the clock frequency $f_{CL}$ is expressed by the following formula:

$$f_{CL} = M/T_{1H}$$
$$= M \times N \times f_R \quad \text{Hz}$$

For example, when M equals 1,000, N equals 1,000 and the refresh frequency $f_R$ equals 100 Hz, the clock frequency $f_{CL}$ is expressed by the formula:

$$f_{CL} = 100 MHz$$

However, it is difficult to obtain a supply of integrated chip drivers which can be operated at such a high speed.

To overcome these problems, divided X drivers have been constructed to input the data in parallel thereby avoiding the construction having all of the X drivers connected in cascade. The X driver is divided into k sections, k being an integer. Accordingly, to input data in each of the X drivers in parallel the sampling frequency of the X drivers becomes $f_{CL/k}$, thereby decreasing the necessity for high speed operation.

Reference is now made to FIG. 2, wherein a block diagram depicting a parallel input system having two analog line sequential drivers is shown. The display data is input digitally from VRAM1 to digital to analog converter 20a. Digital to analog converter 20a outputs analog video signals VIDEO L. Divided analog line sequential driver 1a receives video signal VIDEO L and provides an output to drive a panel portion 3a of active matrix panel 3. Similarly, digital to analog converter 20b converts the digital data received from VRAM 2 to analog signal VIDEO R. An analog line sequential driver 1b receives the VIDEO R signal and provides a driving signal to matrix panel 3b of active matrix panel 3. Y driver 2 is connected to liquid crystal panel 3. The other necessary and conventional clock signals are also input to the drivers as discussed above, but are not shown.

This parallel input system has also been less than satisfactory. This construction requires operating digital analog converters 20a, 20b at a high speed. Additionally, when an offset voltage is generated between the analog output of digital to analog converters 20a, 20b, the contrast ratio of the left half matrix panel 3a is different from that of right half matrix panel 3b. Additionally, a vertical line may be generated at the boundary of left panel 3a and right panel 3b.

Another conventional circuit for driving a liquid crystal display panel consists of digital input terminals of K bits and an external power supply at a level of $2^k$. One of the external power supplies corresponding to the data is selected. If the number of source lines is M, M being an integer, the number of analog switches for driving the circuit becomes large, namely M×2. As a result, it becomes difficult to put such a circuit into practical use because of chip size and cost.

Accordingly, it is desirable to provide a circuit for driving an active matrix liquid crystal display panel which overcomes these shortcomings of the prior art devices and produces an analog gray scale display from a large volume of digital data.

SUMMARY OF THE INVENTION

Generally speaking, in accordance with the invention, a circuit for driving an active matrix liquid crystal panel having M source lines is provided. The active matrix liquid crystal is divided by intersecting source lines and gate lines TFT pixel electrodes are positioned at each intersection of a source line and gate line. Digital data consisting of K bits is provided. A video voltage having variable levels which sequentially increase from an OFF level of the liquid crystal to an ON level at least once during each horizontal scanning period of the video signal is input to an analog switch which provides the video voltage to the source lines. A control circuit controls the duration of the ON state of the analog switch in accordance with the K bit digital signal.

Accordingly, it is an object of this invention to provide an improved circuit for driving a liquid crystal display panel.

A further object of the present invention is to provide a driving circuit through which gray scale display is effected upon the input of the digital signals in a liquid crystal display panel for displaying a large capacity of digital information.

Still other objects and advantages of the invention will in part be obvious and will in part be apparent from the specification and drawings.

The invention accordingly comprises the features of construction, combinations of elements and arrangements of parts which will be exemplified in the construction hereinafter set forth and the scope of the invention will be indicated in the claims.

BRIEF DESCRIPTION OF THE DRAWINGS

For a fuller understanding of the invention, reference is had to the following description, taken in connection with the accompanying drawings, in which:

FIG. 6 is a block diagram of an alternative embodiment of a driving circuit for a liquid crystal display in accordance with the invention;

FIG. 7 is a timing chart for the driving signals of the invention in accordance with the alternative embodiment;

DESCRIPTION OF THE PREFERRED EMBODIMENTS

Figure 3:
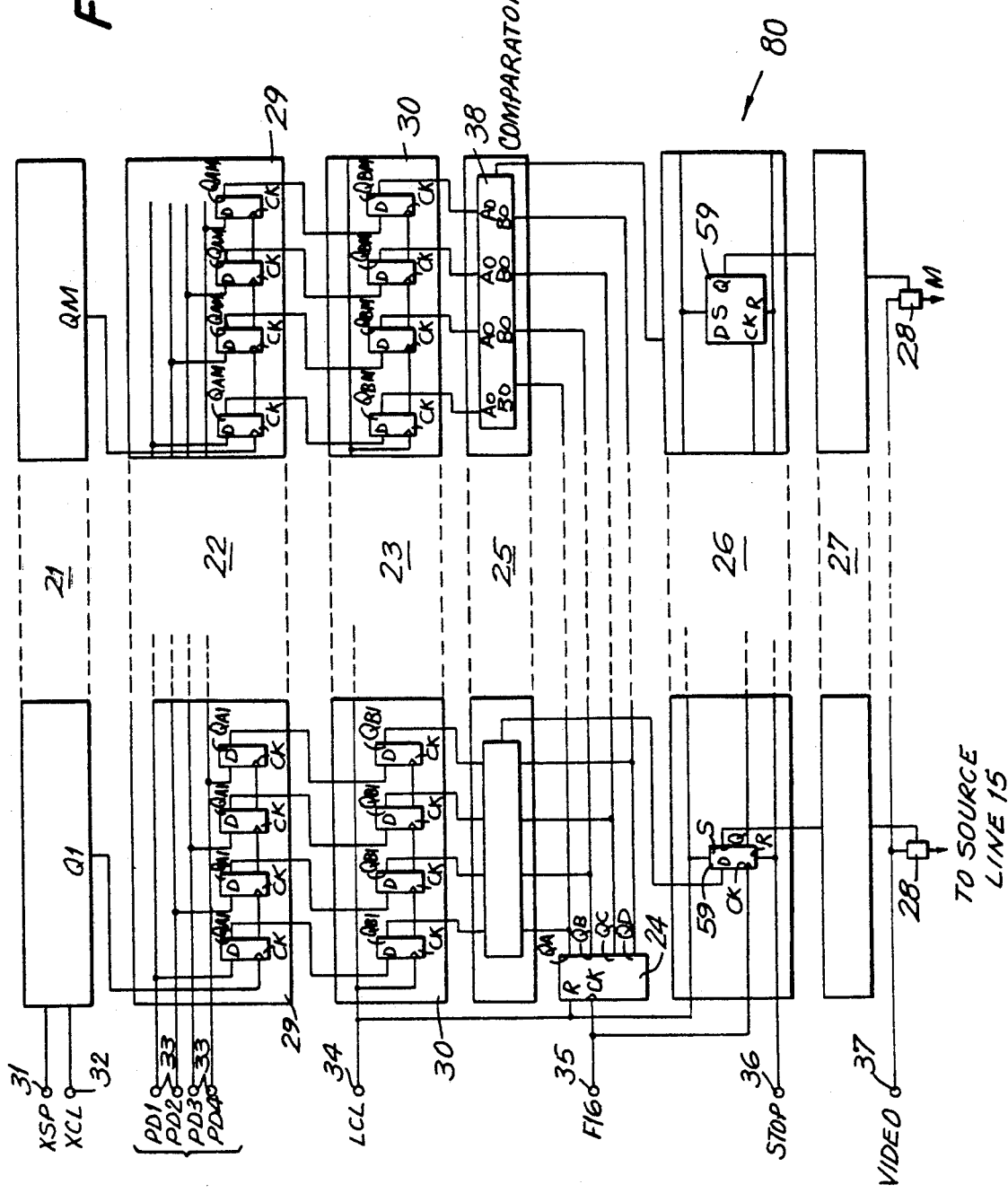
FIG. 3 is a block diagram of an X driver of a circuit for driving a liquid crystal panel in accordance with the present invention.

Reference is made to FIG. 3 wherein a block diagram of an X driver, generally indicated as 80, of a drive circuit for a liquid crystal display panel having TFT (thin film transistor) elements in accordance with the invention is depicted.

X driver 80 includes a shift register 21 having series of outputs Q1-QM. A first latch circuit group 22 consists of K bit latch circuits 29 grouped together in groups of K. By way of example, in X driver 80, K equals four. A second latch circuit group 23 latches the data latched in latch circuit group 22 as an entire group. A comparator group 25 including comparators 38 receives the input from second latch circuit group 23 and compares the input to the output of a four bit binary counter 24. Flip flop group 26, including a plurality of individual D flip flops 59, receives an input from each comparator 38 and provides an output to a level shifter 27. Level shifter 27 provides an output to M respective analog switches 28.

Shift register 21 receives a start pulse XSP at input 31 as a shift data input signal. Shift register 21 also receives a clock signal XCL at an input 32 as a shift clock input signal for synchronizing the outputting of each shift address upon the receipt of start pulse 31. A group consisting of four half latch circuits 29 located within first shift circuit group 22 corresponds to each output of shift register 21. A group of four half latch circuits 30 arranged within second latch circuit group 23 corresponds in a one to one correlation to the respective group of four latch circuits 29. A plurality of latch circuit groups is contained within latch circuit 22 while a plurality of latch circuit groups is contained within latch circuit 23. Accordingly, each step of the first latch circuit 22 receives a four bit input signal corresponding to data PD1-PD4 at an input 33 synchronously with the corresponding output Qn of shift register 21, where n is a natural number less M. Specifically, each latch circuit of latch circuits 29 consists of a D flip flop with a data input (PD1-PD4) to the corresponding D terminals, Qn applied to all four clock terminals of the four flip flops of the group and an output at respective Q terminals.

A latch clock signal LCL is input to second latch circuit 23 through an input 34 causing the latched data of first latch circuit 22 to be input as a whole into second latch circuit 23. Each latch circuit of latch circuits 30 also consists of a D flip flop with the Q output of the corresponding flip flop of latch circuits 29 applied as the D input to a corresponding flip flop of latch circuits 30. Latch clock signal LCL is applied to the clock inputs of all of the flip flops of latch cirucits 29. An output is taken at respective Q terminals of the flip flops. At the same time, four bit binary counter 24 receives latch clock signal LCL and is reset to count a gray scale reference signal F16 at input 35. The outputs of second latch circuit group 23 are in the form of M×4 bit outputs. Each comparator 38 of comparator group 25 compares the output of the corresponding latch circuit 30 with the output of binary counter 24. When conformity between both outputs is detected, comparator 38 outputs a comparator output signal Y.

Comparator output signal Y is input to each flip flop 59 of flip flop group 26 at the rising of gray scale reference signal F16. Each flip flop 59 is set/reset respectively by latch clock signal LCL and a stop signal STOP input as a clock input at input 36, so that it is set by the latch clock signal LCL and reset by stop signal STOP. Each flip flop 59 is of the D-type, with comparator output signal Y applied to the D terminal, gray scale reference signal F16 is applied to the clock terminal and an output is taken at the Q terminal.

Level shifter 27 increases the output voltage of each D flip flop 59 and outputs the increased voltage to respective analog switches 28. A video voltage VIDEO input at 37 is converted L times from an OFF level to an ON level of the liquid crystal during one horizontal scanning period 1H. L is greater than or equal to 1. Analog switches 28 control the connection between the input 37 and source line 15, switching between a connect and disconnect condition.

Figure 1:
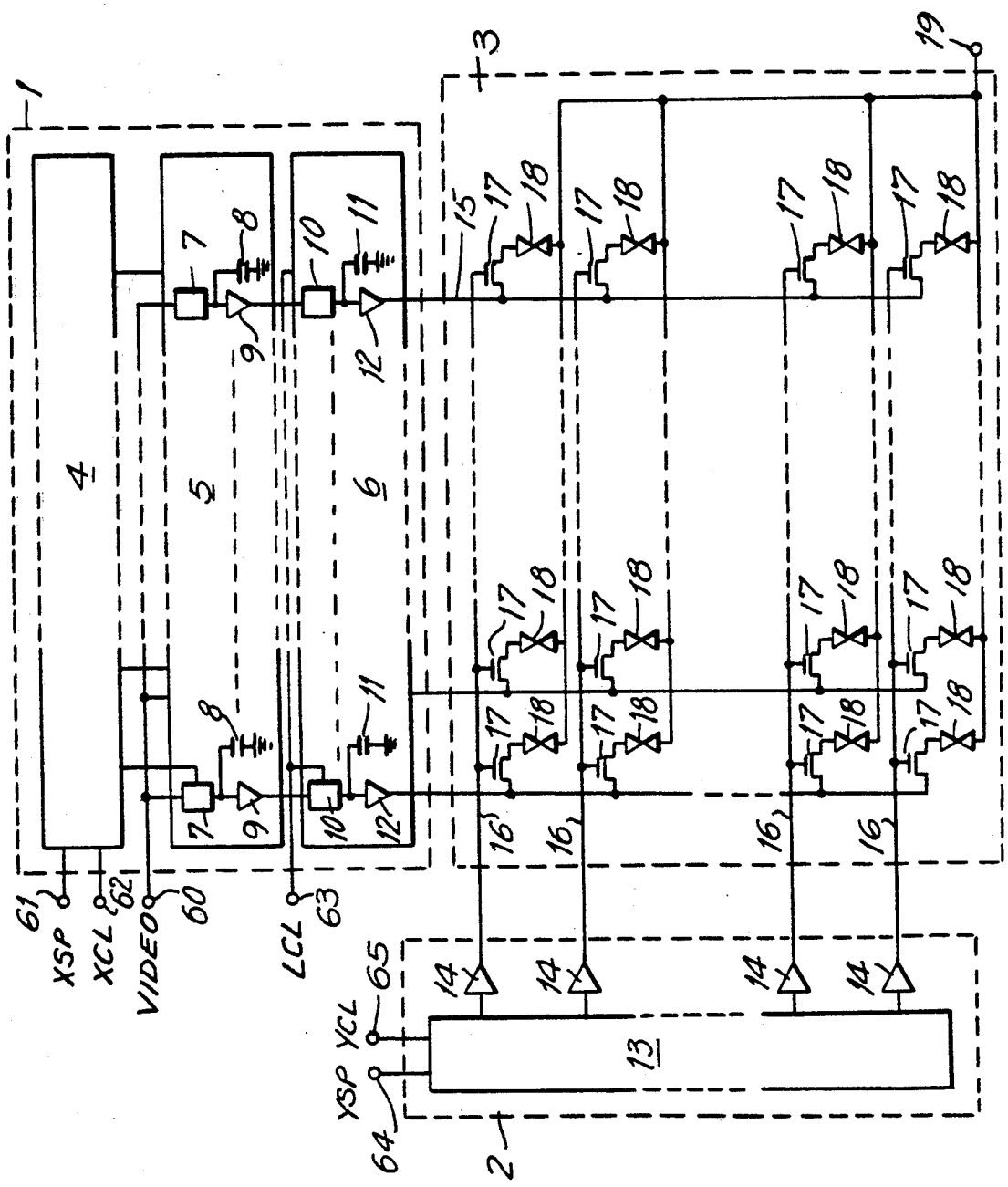
FIG. 1 is a block diagram of an analog line at a time driving circuit in accordance with the prior art.
Figure 2:
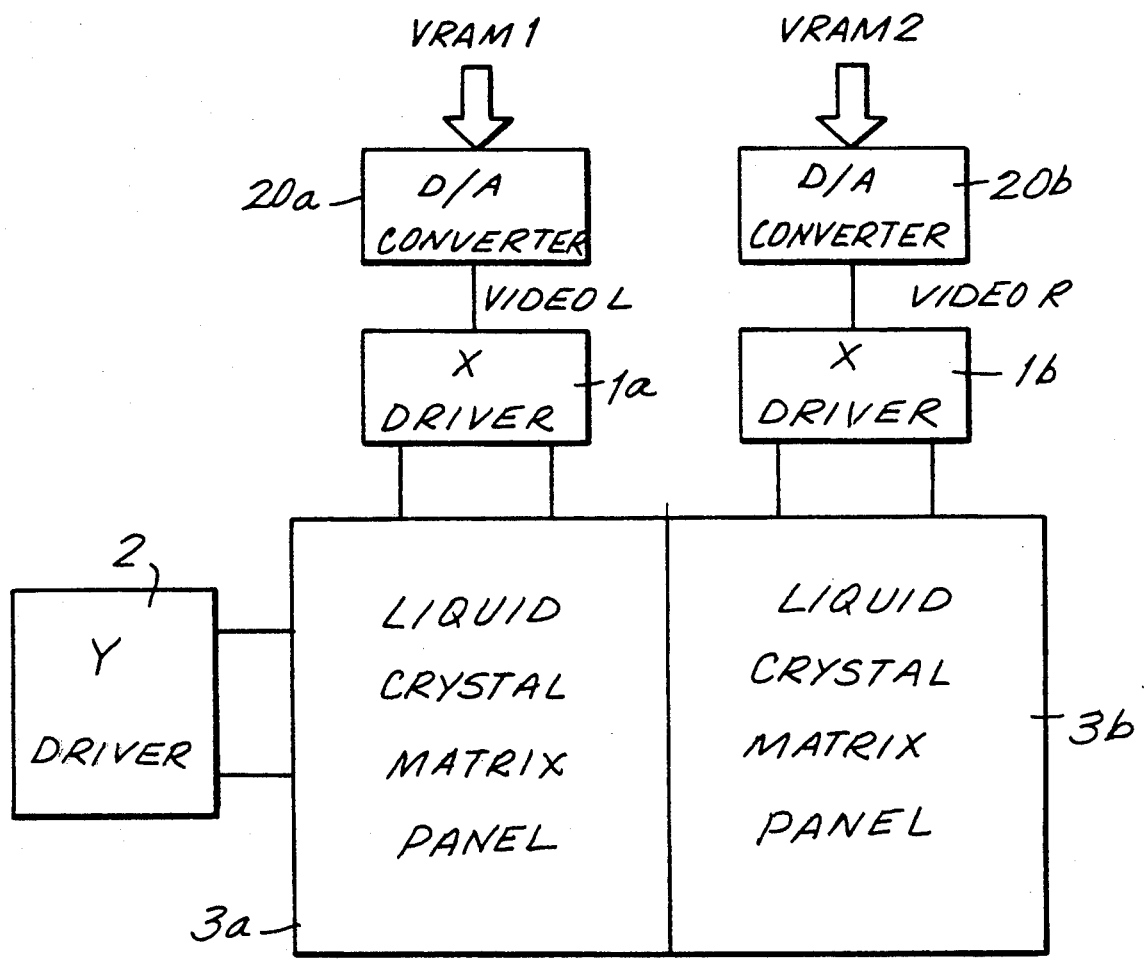
FIG. 2 is a block diagram of a second liquid crystal display driving system in accordance with the prior art.
Figure 4:
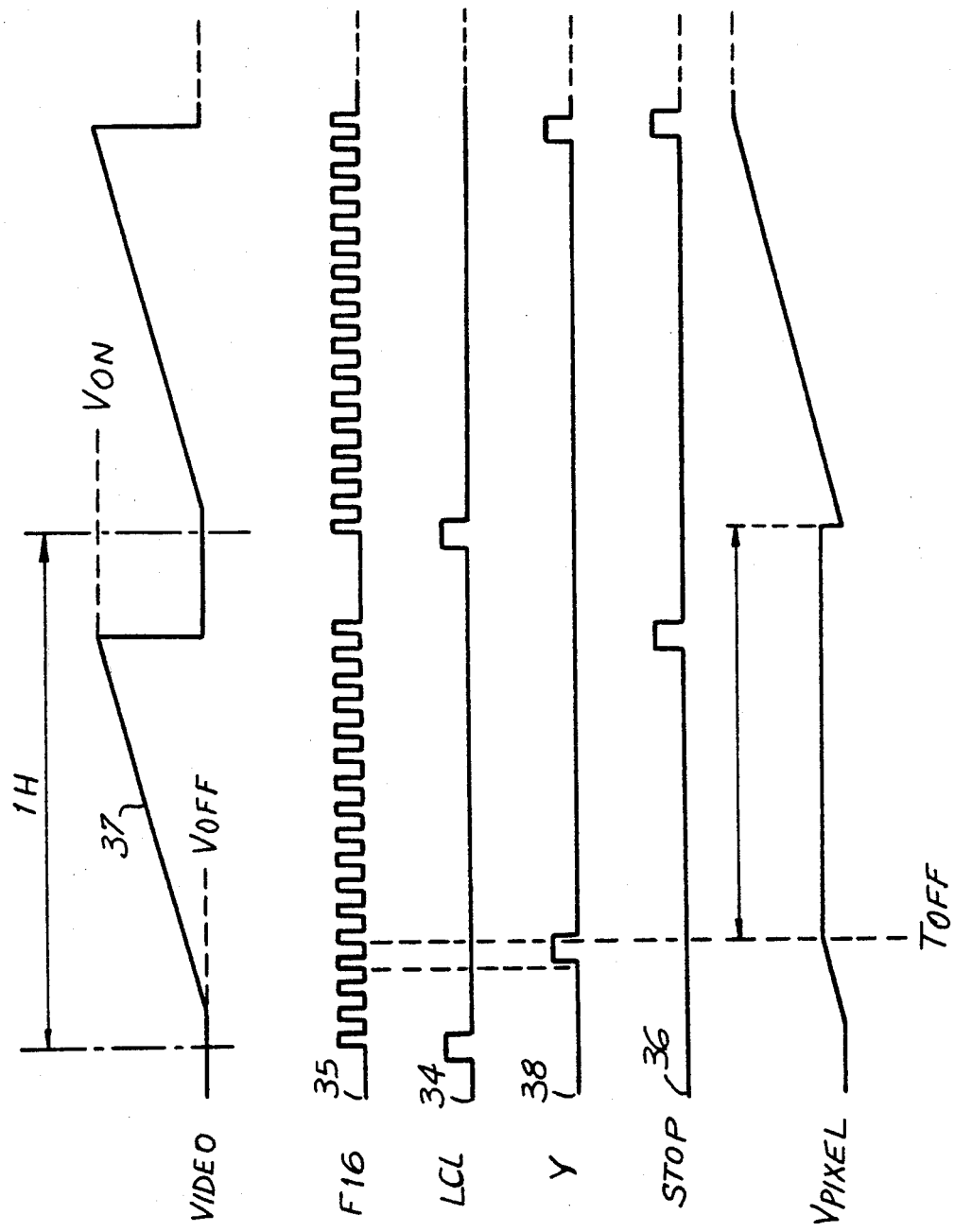
FIG. 4 is a timing chart for the input signals of the X driver in accordance with the invention.

Reference is now made to FIG. 4 in which a timing chart of the operation of X driver 80 is provided. VIDEO corresponds the video voltage input at 37 and in this embodiment, the video voltage is continuously converted a single time during each horizontal scanning period 1H from the OFF level $V_{OFF}$ to ON level $V_{ON}$. F16 corresponds to the gray scale reference signal input at 35. LCL corresponds to the latch signal input at 34. Y is the comparator output signal output from each comparator 38. STOP corresponds to the stop signal input at 36. $V_{pixel}$ is the voltage actually applied to pixel electrode 18 of active matrix liquid crystal display panel 3 (FIG. 1).

$T_{OFF}$ indicates the beginning of the time period when the output of analog switch 28 is disconnected from source line 15. After being disconnected, the voltage is maintained by the capacitance of source line 15 for a period t corresponding to the time period in which analog switch 28 is turned to the OFF state and returned to the ON state.

Figure 5:
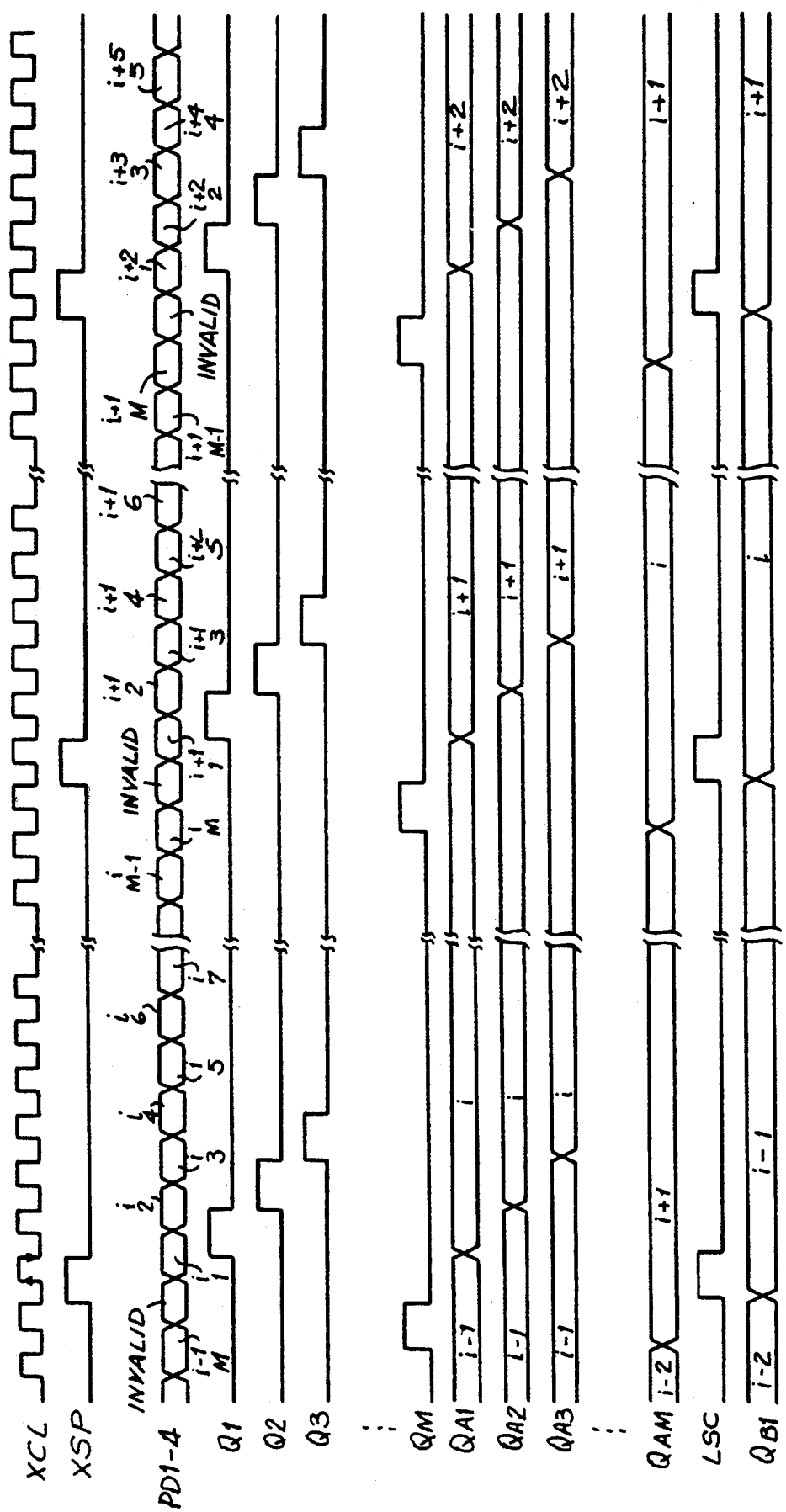
FIG. 5 is a timing chart of the input signals and internal signals of the X driver in accordance with the invention.

Reference is now made to FIG. 5, wherein the timing of the internal signals of X driver 80 are provided XCL corresponds to the clock signal input at 32 and XSP corresponds to the start pulse input at 31. $Q_1$, $Q_2$, $Q_3$ ... $Q_m$ correspond to the first step, second step, third step to MTH step output signals of shift register 21. Shift register 21 shifts start pulse XSP synchronously with the fall of each clock signal XCL. PD1-4 correspond to the 4 bit data input signal input at 33. The letter i illustrates the data of the ith row and jth column.

Data bits PD1-4 are input to first latch circuit group 22. Each output $Q_{An}$ of first latch circuit group 22 provides an output at the rise of $Q_n$ where $1 \leq n \leq M$, corresponding to the output of each address of shift register 21. $Q_{An}$, where n is an integer, corresponds to the nth step output signal of first latch circuit 22. LCL corresponds to the latch clock signal input at 34. $Q_{An}$ is input to second latch circuit 23 at the fall of the pulses of latch clock signal LCL. Second latch circuit group 23 outputs $Q_{Bn}$ at the rise of each successive LCL pulse. $Q_{Bn}$ corresponds the nth step output signal of second latch circuit group 23. The letter i indicates the data of each ith row.

Reference is now made to FIG. 6 in which a block diagram of a second embodiment of a drive circuit for a liquid crystal display panel is provided In this embodiment, an analog switch group 68 includes discharging switches SWD 41 and charging switches SWV 42 A discharging signal $\overline{DIS}$ is input at an input 43. $V_{DIS}$ is a discharging power supply located at input 44. During a single horizontal scanning period, the initial potential of source line 15 is supplied by a discharge of power supply $V_{DIS}$ having a lower impedance than that of the video voltage VIDEO input at 37. By providing a voltage supply of lower impedance it is possible to increase the speed of discharge, increasing the time t for charging the voltage signal and increasing the ratio for charging the signal of pixel electrode 18.

Reference is now made FIG. 7 in which the timing of the output driving signal for the switch group 68 is provided Upon an initial input of discharge signal $\overline{DIS}$ during one horizontal scanning period, $V_{DIS}$ is supplied from all the output terminals of switch group 68 and the potential of source line 15 becomes $V_{OFF}$, corresponding to the OFF level. In this embodiment it becomes possible to make the time for charging the signals of the pixel electrode 18 longer. For this reason, this construction is more effective for driving large size crystal display panels having a short horizontal scanning period.

Figure 8:
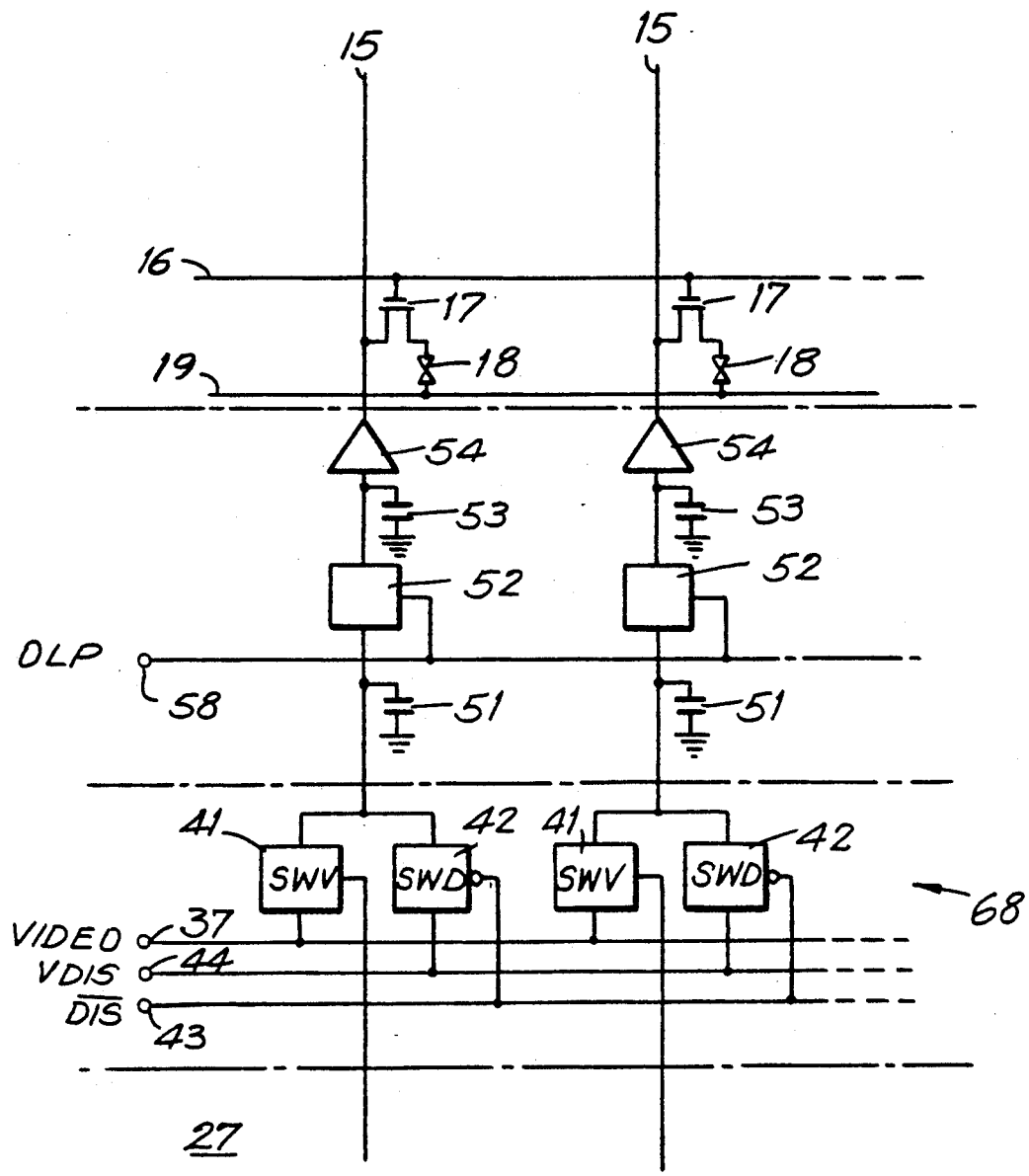
FIG. 8 is a circuit diagram of a third embodiment of a driving circuit for a liquid crystal display in accordance with the invention.

Reference is now made to FIG. 8 in which a third embodiment of a drive circuit for a liquid crystal display is provided. In this embodiment, a latching circuit, generally indicated as 70 is added to the switch group 68. Latching circuit 70 includes a first step sample hold circuit 51 formed as a capacitor receiving the output of either of switches 41 or 42. A second capacitor acting as a second step sample hold circuit 53 receives the output of a second analog switch 52. An analog buffer 54 amplifies the output current in order to maintain the output signals until the next horizontal scanning period. Second analog switch 52 is gated by a signal OLP at input 58. Latching circuit 70 maintains the signals output by either of switches 41 or 42 until the next horizontal scanning period.

In this embodiment, the signal voltage corresponding the data is applied to source line 15 from the beginning of the first horizontal scanning period, therefore making it possible to increase the rate of charging the signal of pixel electrode 18 to obtain a better display.

Figure 9:
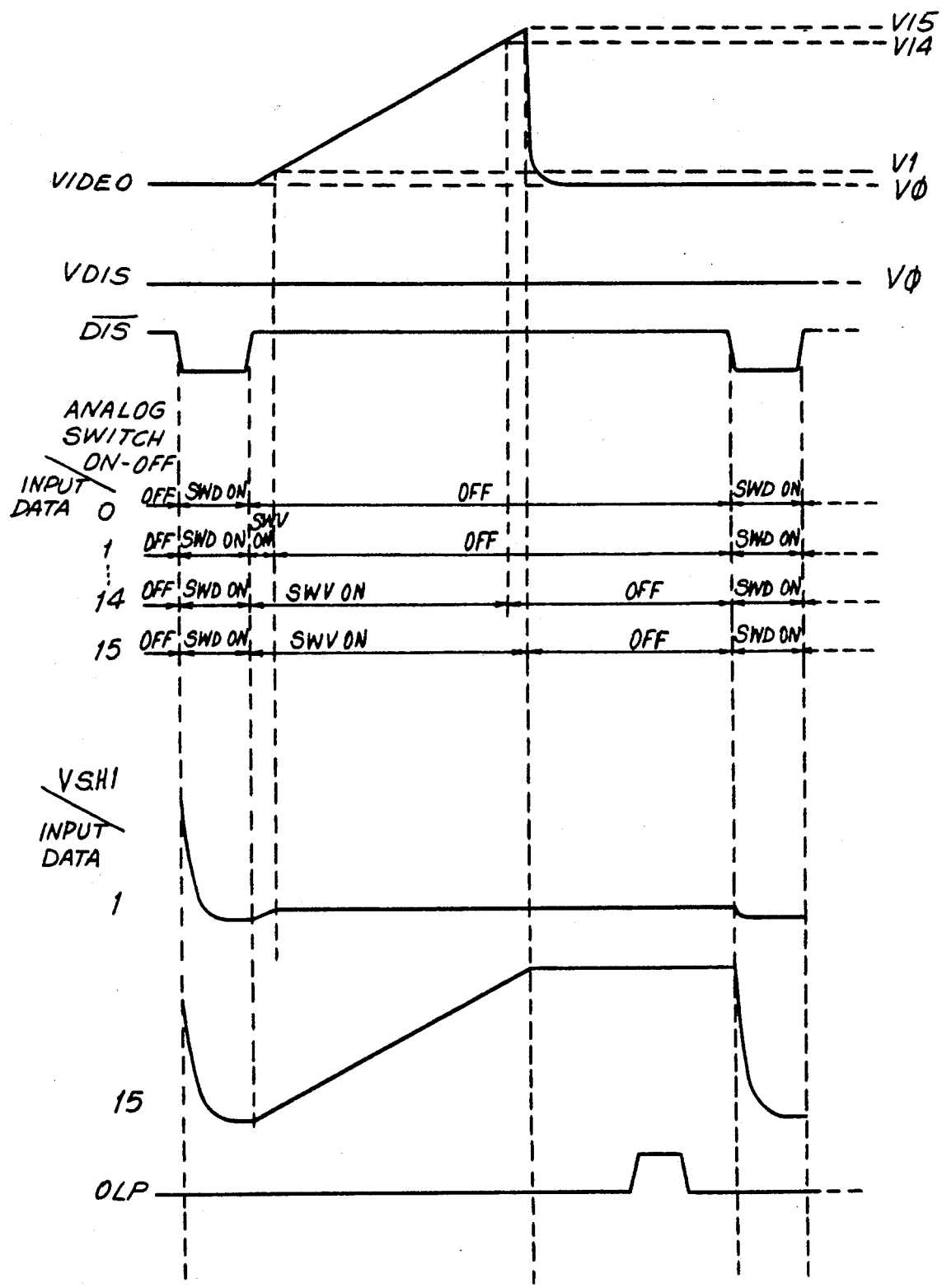
FIG. 9 is a timing chart for the third embodiment of the driving circuit in accordance with the invention.

Reference is now made to FIG. 9 which is the timing chart for the output driving signal of the driving circuit of FIG. 8. The analog switch ON/OFF portion shows the ON/OFF state of discharging switch SWD and charging switch SWV at different data inputs. When SWD 42 is in the ON state, the discharging voltage $V_{DIS}$ of the discharge voltage supply is selected and when SWV is in the ON state, the voltage VIDEO is selected. As shown in FIG. 9, when SWD 42 and SWV 41 are in the OFF state the output wave form is in a high impedance condition.

The voltage of first step sample hold circuit 51 is shown by V-S.H1 of FIG. 9 at different input data. OLP is a latch signal input to analog switch 52 at an input 58. When OLP is high, analog switch 52 is turned on. During the ON state, the sample signal voltage is maintained by the capacitance of the next sample hold circuit 53 and the sampled voltage is applied to source line 15 after amplification of the signal voltage by analog buffer 54. In the construction in accordance with the invention, when it is impossible to charge signals in the pixel elements, the construction including the sample hold circuit and analog buffer shown in FIG. 8 is required.

As described above, a circuit for driving an active matrix liquid crystal panel according to the present invention allows for VIDEO voltage to be continuously converted L times from the ON state to the OFF state of the liquid crystal during one horizontal scanning period. The analog switch is in the ON state at the beginning of first horizontal period. The source line is charged until reaching the voltage corresponding to the input digital signal. Upon receiving the charge, the analog switch is then turned off. The voltage is then maintained by the capacitance of the source line, thereby making it possible to input the analog signal upon the input of the digital signal. It then becomes easy to provide an interface between several kinds of digital signals process systems in the circuit. It no longer becomes necessary to provide a digital to analog converter which must be operated at a high speed or to control an offset voltage as was necessary in the prior art when the X driver had to be combined with a digital to analog converter. Only one analog switch is now required for each source line, therefore it is possible to decrease the cost.

Additionally, the present invention provides a superior gray scale display, therefore it can be adapted to several kinds of display devices, such as a display device having a high resolution and a device having displays of several sizes.

It will thus be seen that the objects set forth above, among those made apparent from the preceding description, are efficiently obtained and some certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all the generic and specific features of the invention herein described and all statements of the scope of the invention which as a matter of language might be said to fall therebetween.

What is claimed is:

1. A circuit for driving an active matrix liquid crystal display having M rows and N columns by video digital input data consisting of K bits wherein K is an integer at least equal to one, the columns intersecting the rows at a plurality of thin film transistors at least in part forming a pixel at each intersection of a row and a column comprising:

analog switching means capable of an ON and OFF state for receiving a video voltage and a control signal and selectively outputting the video voltage to each column, wherein the video voltage varies in level, sequentially at least between an OFF state of the liquid crystal display and an ON state at least once each horizontal scanning period, the analog switching means including discharging switch means for receiving a discharging signal and a discharge power supply and for selectively applying the discharge power supply input input in response to the discharging signal to the associated column for each scanning period before the application of the video voltage to the column;

a charging switch for receiving the video voltage, in response to the control signal, said video voltage having a higher impedance than the discharge power supply; and control means for receiving the K bit digital input data and producing the control signal for controlling the time of the ON state of the analog switching means in response to said input data.

2. The circuit of claim 1, wherein the control means comprises a shift register means for providing a shifted output, at least a portion of the shifted outputs each being associated with a pixel along a row during each horizontal scanning period;

a plurality of latching means each associated with one of the pixels along a row during each horizontal scanning period for receiving the K bit digital data to provide a latched data signal;

binary counter means for producing a gray scale reference signal variable in a range substantially corresponding to the range of the K bit digital input data during each cycle of the video voltage; and a plurality of comparator means each associated with a latching means for comparing the latched data signal and the gray scale reference signal to produce the control signal.

3. The circuit of claim 2, wherein each of said plurality of latching means includes a first latching means for receiving the K bit digital data and latching the input in response to a shifted output of the shift register means to provide a first latched data signal; and a plurality of second latching means, each for receiving a common latch clock signal and the associated first latched data signal for essentially simultaneously latching all of the first latched data signals of the first latching means to produce in each of the corresponding second latching means a second latched data signal for application to the comparator means.

4. The circuit of claim 2, wherein the analog switching means includes an analog switch associated with each said pixel along a row for applying a video voltage to the associated pixel of a level determined by the K bit digital input data.

5. The circuit of claim 3, wherein the analog switching means includes an analog switch associated with each pixel along a row for applying a video voltage to the associated pixel of a level determined by the K bit digital input data.

6. The circuit of claim 2, and including a plurality of flip flop storage means each associated with a comparator means for storing the output of the comparator means at least during each cycle of the video voltage for application to the analog switching means.

7. The circuit of claim 6, and including level shifter means for increasing the level of each of the flip flop storage means for application to the analog switching means.

8. The circuit of claim 3, wherein each of the first and second latching means includes K flip flops which are commonly clocked, one of said flip flops being associated with each of the K data bits.

9. The circuit of claim 1, further comprising third latching means for receiving the output of the analog switching means and latching the signal until the following horizontal scanning period.

10. The circuit of claim 9, wherein the third latching means includes a first step sample hold circuit for receiving the output of the analog switching means and producing a latched sample signal; a second analog switching means for receiving the latched sample signal and a second step sample hold circuit for receiving the output ON from the second analog switch for latching the output until the following horizontal scanning period.

11. The circuit of claim 10, wherein the first and second step sample hold circuits each comprise a capacitor coupled to a reference voltage.

12. The circuit of claim 11, wherein the reference voltage is ground.

13. The circuit of claim 10, and including analog buffer means between the second step sample hold circuit and the associated column of pixels.

14. The circuit of claim 1, wherein each row is defined by a source line and each column is defined by a gate line.

15. The circuit of claim 1, wherein K=4.

16. The circuit of claim 1, wherein the video voltage varies in level by increasing from an OFF state of the liquid crystal display to at least an ON state.

* * * * *